United States Patent [19]

Imai et al.

[11] 4,391,521

[45] Jul. 5, 1983

[54] PHOTOMETER HAVING ASYMMETRICAL APERTURE AND WITH COMPENSATION FOR DIRECTION OF INCIDENCE

[75] Inventors: Toshihiro Imai, Hachioji; Toyotaka Yamada, Hino, both of Japan

[73] Assignee: Olympus Optical Co., Ltd., Tokyo, Japan

[21] Appl. No.: 188,146

[22] Filed: Sep. 17, 1980

[30] Foreign Application Priority Data

Sep. 18, 1979 [JP] Japan ............................ 54-119832

[51] Int. Cl.$^3$ ............................................ G01J 1/04
[52] U.S. Cl. ............................... 356/225; 354/59
[58] Field of Search ............... 356/225; 350/167, 286; 354/42, 49, 59, 23 R

[56] References Cited

U.S. PATENT DOCUMENTS

| | | | |
|---|---|---|---|
| 3,134,021 | 5/1964 | Ploke | 356/225 |
| 3,162,766 | 12/1964 | Ploke | 356/225 |
| 3,416,867 | 12/1968 | Biber | 350/167 |

*Primary Examiner*—Bruce Y. Arnold
*Attorney, Agent, or Firm*—Cushman, Darby & Cushman

[57] ABSTRACT

A photometer having asymmetrical apertures and with compensation for direction of incidence includes a photodetector, a mask having asymmetrical apertures and arranged before the photodetector and a compensation prism arranged either before or after the mask. The photometer is adapted to compensate for the difference in quantity of light incident on the photodetector caused by the mask depending on the difference in the direction of incidence of the light.

6 Claims, 9 Drawing Figures

FIG. 1 (PRIOR ART)
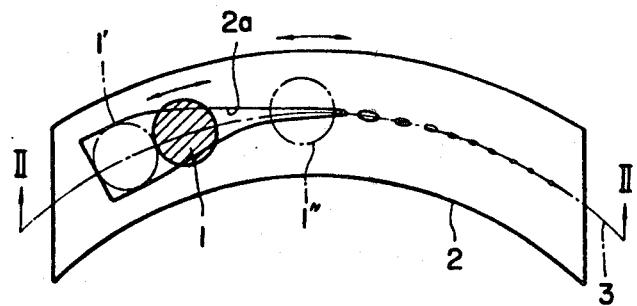
FIG. 2
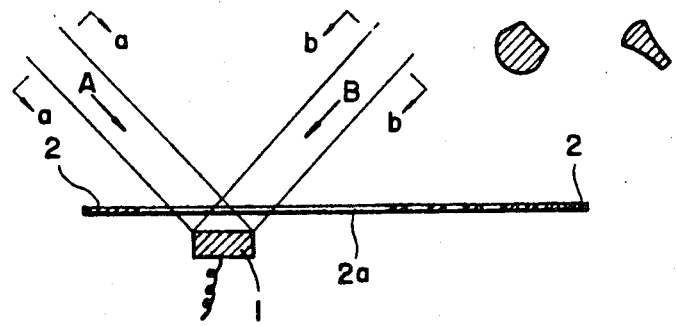
FIG. 2a   FIG. 2b
FIG. 3
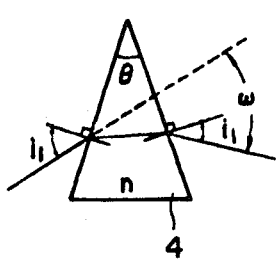
FIG. 4
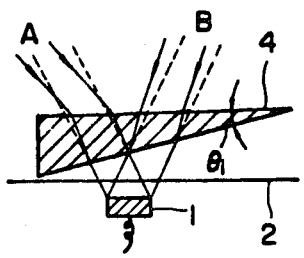

PHOTOMETER HAVING ASYMMETRICAL APERTURE AND WITH COMPENSATION FOR DIRECTION OF INCIDENCE

BACKGROUND OF THE INVENTION (a) Field of the Invention

The present invention relates to a photometer equipped with a mechanism for compensating film speed such as ASA speed or DIN speed (a mechanism for compensating quantity of light incident on a photodetector depending on film speed) and so adapted as to prevent a difference in quantity of light depending on directions of incidence caused by a mask having asymmetrical apertures used in said compensation mechanism.

(b) Description of the Prior Art

For a photographic camera having a relatively simple construction, ASA speed is compensated as illustrated in FIG. 1. In this drawing, the reference numeral 1 represents a photodetector, and the reference numeral 2 designates a mask having asymmetrical apertures 2a for limiting quantity of light reaching the photodetector 1. The mechanism for compensating ASA speed consisting of the photodetector 1 and mask 2 functions as described below. So far as an object to be photographed is at the same brightness, it is necessary to select a higher shutter speed for a film having higher ASA speed than that for a film having a lower ASA speed. It is therefore required to adjust the quantity of light incident one the photodetector 1 in accordance with variation of film speed (ASA value). Such adjustment is performed by shortening the time required for total of light quantity to reach a certain predetermined value when the ASA value is high, and prolonging the time when the ASA value is low. Speaking specifically with reference to the film speed compensating mechanism shown in FIG. 1, the adjustment is performed by displacing the photodetector 1 and mask 2 relatively to each other along the chain line 3. The relative positional relationship between the photodetector 1 and mask 2 is set in such a manner that the photodetector 1 is located at the position 1' for a film having a speed of ASA 400, for example, and the position 1" for a film having a speed of ASA 100.

In a case where a mask having apertures of such asymmetrical shapes as those shown in FIG. 1 (called tear drop shapes) is used, the asymmetry makes the quantity of incident light different depending on the direction of incidence of the light, thereby making it impossible to obtain a correct shutter speed. When the photodetector is located at the position of the crosshatched circle in FIG. 1, a light pencil incident obliquely from the left side has a sectional area which is different from that of a light pencil incident obliquely from the right side. FIG. 2 shows a sectional view taken along the II—II line in FIG. 1. Let us consider a light pencil A and another light pencil B in FIG. 2. In this drawing, the light pencil A has a sectional area in the a—a direction as shown in FIG. 2a, whereas the light pencil B has a sectional area in the b—b direction as shown in FIG. 2b. Therefore, there is a difference in the quantity of light that is incident from the left side versus that incident from the right side, whereby the quantity of light incident on the photodetector is made different between two cases where the left side is brighter and where the right side is brighter. Since the shutter operates at a predetermined speed, the difference in distribution of brightness on the object to be photographed results in underexposure and overexposure.

As is clear from the above descriptions made on the mechanism for compensating ASA speed, general film speed compensating devices having asymmetrical apertures before the photodetector pose the problem of an unbalance in the quantity of light for exposure.

SUMMARY OF THE INVENTION

The present invention has been accomplished to eliminate the defect of the conventional film speed compensating mechanism and has a general object to provide a photodetector so adapted as to permit stable light intensity measurement at all times by arranging a series of prisms for compensating the above-mentioned unbalance in the light quantity in the vicinity of a mask having asymmetrical apertures.

Now, the principle of the present invention will be described with reference to the accompanying drawings. When light is incident at an angle of incidence $i_1$ on a prism 4 having a top angle $\theta$ as shown in FIG. 3, let us designate an angle of deviation between the incident and emergent rays and an angle of emergence as $\omega$ and $i_2$ respectively. Then, the angle of deviation is expressed as $\omega = (i_1 + i_2) - \theta$. The light is therefore deviated by an angle of $\omega$. When such a prism 4 is placed before the photodetector 1, the light passes as shown in FIG. 4. Speaking specifically, the light incident along the dashed lines deviates as indicated by the solid lines when the prism 4 is arranged before the photodetector 1. This means that the light pencil has a smaller sectional area on the left side and a larger sectional area on the right side on the plane perpendicular to the paper of FIG. 4. On the other hand, the light pencil having passed through an asymmetrical aperture as shown in FIG. 2 has a larger diameter on the left side and a smaller diameter on the right side in the direction perpendicular to the paper sheet. Therefore, sectional area of the left side light pencil having the larger diameter is reduced, and that of the right side light pencil having the smaller diameter is enlarged by arranging the prism 4. Further, since the reduction and enlargement of the sectional areas of the left and right side light pencils are dependent on a value of $\theta$, it is possible to equalize sectional areas of the left and right side light pencils by selecting an adequate value of $\theta$. Furthermore, since the difference in sectional areas between the left and right side light pencils caused by asymmetry of the aperture in the mask is also dependent on the shape of the aperture, an optimum value of $\theta$ is to be selected in accordance with the shape of the aperture.

BRIEF DESCRIPTION OF THE DRAWINGS

FIG. 1 shows a diagram illustrating the construction of the conventional photodetector using asymmetrical apertures; FIG. 2 shows a sectional view taken along the II—II line illustrating the manner of light pencils incident obliquely from the left and right sides respectively;

FIG. 2a shows a sectional view illustrating sectional areas of the light pencils in the direction of a—a line in FIG. 2;

FIG. 2b shows a sectional view illustrating sectional areas of the light pencils in the direction of b—b line in FIG. 2;

FIG. 3 and FIG. 4 show diagrams illustrating the principle of the present invention;

DETAILED DESCRIPTION OF THE PREFERRED EMBODIMENT

Figure 5:
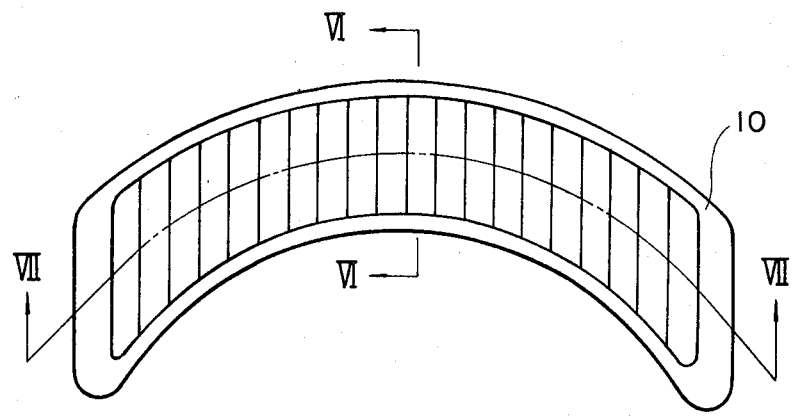
FIG. 5 shows a plan view illustrating an embodiment of the present invention.
Figure 6:
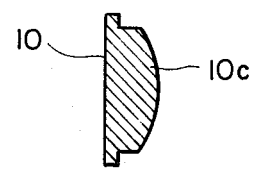
FIG. 6 shows a sectional view taken along the VI—VI line in FIG. 5.
Figure 7:
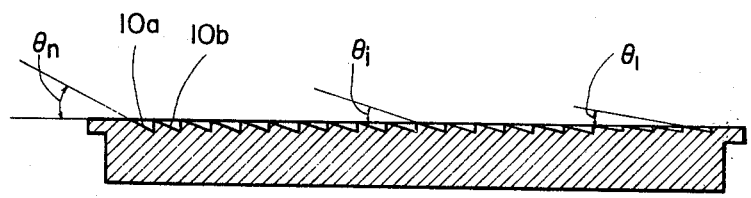
FIG. 7 shows a sectional view taken along the VII—VII line in FIG. 5.

Now, a preferred embodiment of the present invention will be described with reference to the accompanying drawings. FIG. 5 shows a diagram illustrating the prism for compensating the difference of light quantity due to the asymmetrical apertures; FIG. 6 and FIG. 7 illustrating sectional views taken along the VI—VI line and VII—VII line respectively in FIG. 5. As is understood from these drawings, the series of prism 10 has a convex bottom surface 10c as shown in FIG. 6, a top surface in the shape of saw teeth consisting of wedge-shaped prisms 10a, 10b . . . as shown in FIG. 7, and an entire form of an arc along the axis 3 as shown in FIG. 5. Further, angles $\theta$ of the saw-teeth prisms are selected in such a manner that angles are increased step by step from $\theta_1$ to $\theta_1$ at one end set at 5° and $\theta_n$ at the other end set at 25°, for example, as shown in FIG. 7. Values of these angles are selected in such a manner that they are optimum for equalizing the sectional areas of the right and left light pencils corresponding to the prisms 10a, 10b, . . . of the compensation prism 10 when it is arranged opposite to the mask 2.

When the prism 10 having the above described form is placed before the photodetector 1 and after the mask 2 (between the photodetector 1 and mask 2) or before the mask 2, it is possible to correct unbalance of the light incident on the photodetector caused by the asymmetrical aperture 2a of the mask 2 with the compensation prism 10. This embodiment has a form matched with the aperture 2a of the mask 2 shown in FIG. 1 and the section taken along the VI—VI line in FIG. 5 has the symmetrical surface 10c since the aperture 2a has a symmetrical shape with regard to the axis 3 in FIG. 1.

If the aperture of the mask is not symmetrical also with regard to the axis 3, the section of the bottom surface 10c in the direction of VI—VI line is to be wedge-shaped as shown in FIG. 7. In addition, it is not always necessary to correspond each of the prisms to the photodetector, but a plural number of prisms may correspond to the photodetector. Though the embodiment has been described taking the compensation of film speed as an example, the photodetector is applicable to the correction of the F number of cameras. For an application to cameras, it will be convenient to arrange it in a mode that the saw-tooth-like surface of the prism will be kept inside so that it will serve also as a cover glass. In such an application mode, the mask will be protected from dust since the mask is covered with the prism which serves also as the cover glass. Furthermore, dust cannot adhere to the saw-tooth-like surface when it is set inside. However, the position of the prism is not restricted to the front of the mask.

The prism may have any desired form so long as it can accomplish the principle of the present invention, and not limited to that illustrated in FIG. 5 through FIG. 7. For example, even a single triangular prism shown in FIG. 4 can bring about the compensation effect though angle of the prism may not be optimum for asymmetrical apertures. When strict compensation is not necessary, it is therefore possible to obtain sufficient compensation effect even with a single triangular prism or a combination of a small number of triangular prisms. When only the vicinity of the photodetector is covered with a single triangular prism, it is unnecessary to move the prism together with the mask.

As understandable from the foregoing descriptions, the photodetector according to the present invention makes it possible to correct the asymmetrical light adoption of the conventional photodetector using asymmetrical apertures and assure favorable light intensity measurement by arranging a series of compensation prisms having a saw-tooth-like form.

What is claimed is:

1. A photometer comprising a photodetector, a mask having asymmetrical apertures and arranged before said photodetector, and a compensation prism arranged in the path of the light to be incident on said photodetector to compensate for the asymmetry of the light pencil which passes through said mask and is incident on said photodetector.

2. A photometer according to claim 1 wherein said compensation prism is arranged between said mask and said photodetector.

3. A photometer according to claim 1 wherein said compensation prism is arranged before said mask.

4. A photometer according to claim 1 wherein said compensation prism is formed of a transparent body having a saw-tooth-like shaped surface.

5. A photometer according to claim 4 wherein the inclination angles of the respective saw-tooth portions of said saw-tooth-like shaped surface increase step by step from one side to the other side of said surface.

6. A photometer according to claim 1 wherein said compensation prism has one side surface shaped in the form of a saw-tooth and the other side surface shaped convexly.

* * * * *